J. KRETZSCHMAR.
KNEADING APPARATUS.
APPLICATION FILED OCT. 15, 1910.

979,675.

Patented Dec. 27, 1910.

Witnesses
H. Pausch
O. Morrill

Inventor:
Johannes Kretzschmar
by O. Madden
Attorney.

UNITED STATES PATENT OFFICE.

JOHANNES KRETZSCHMAR, OF TORGAU, GERMANY, ASSIGNOR TO HERKULES PATENT-VERWERTUNGSGESELLSCHAFT MIT BESCHRÄNKTER HAFTUNG, OF BERLIN, GERMANY.

KNEADING APPARATUS.

979,675.  Specification of Letters Patent. Patented Dec. 27, 1910.

Application filed October 15, 1910. Serial No. 587,236.

*To all whom it may concern:*

Be it known that I, JOHANNES KRETZSCHMAR, a subject of the Emperor of Germany, residing at Torgau-an-der-Elbe, in Germany, have invented certain new and useful Improvements in Kneading Apparatus, of which the following is a specification.

The kneading boards commonly used in kneading machines are either dished or in the form of wooden gratings. Neither of these forms of construction is well adapted for performing true kneading work, the action thereof being rather to roll and turn the dough, which does not have the desired effect on the density and uniformity of the material. A worked lump of dough has small criss-cross folds on its upper and under surfaces, and if the dough has been properly kneaded these folds close entirely when the dough is left at rest after the kneading. If the folds do not close, the work is unsightly. But these folds cannot close if too much meal enters them, and it is of great importance to insure that the supply of meal is adequate but not excessive. For properly proportioning the supply of meal a suitable construction of kneading board is essential, and a board with smooth or grooved dishes is not adequate for this purpose. The meal sprinkled into the dishes is immediately absorbed by the dough, whether there is too much or too little of it, and after a time the dough frequently adheres to the board, there being no coating of meal left thereon. In the case of boards with wooden gratings the dough is forced into the apertures, where it is held fast by the sharp edges and the comparatively large surfaces of the bars, so that the apertures tend to become clogged.

The object of the present invention is to provide kneading apparatus which is free from the disadvantages mentioned, and not only efficiently kneads the work but also allows of effecting a uniform, properly proportioned supply of meal.

The invention is illustrated in the accompanying drawings, in which—

Figure 1:
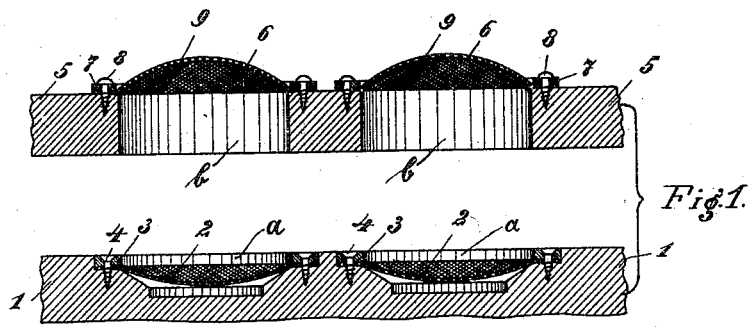
Figure 2:
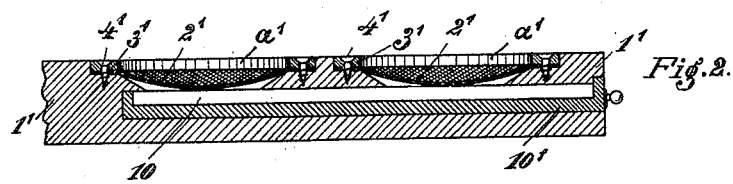
Figure 3:
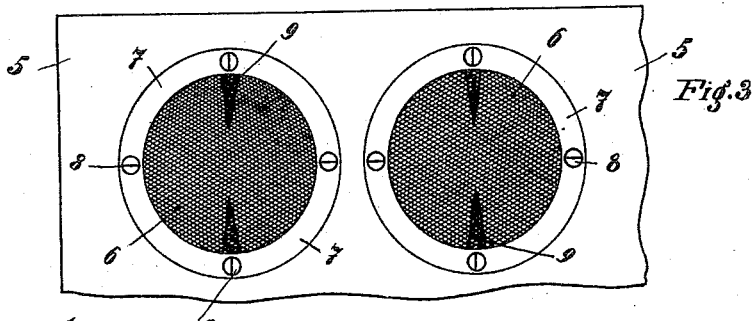

Figure 1 is a vertical section of the upper and lower kneading boards, with parts broken away. Fig. 2 is a vertical section of the lower board, showing a modification. Fig. 3 is a plan-view of the upper board, and Fig. 4 a plan-view of the lower board.

Only two pairs of dishes or cells are shown in the drawing. There are usually thirty or more cells in each board.

Figure 4:
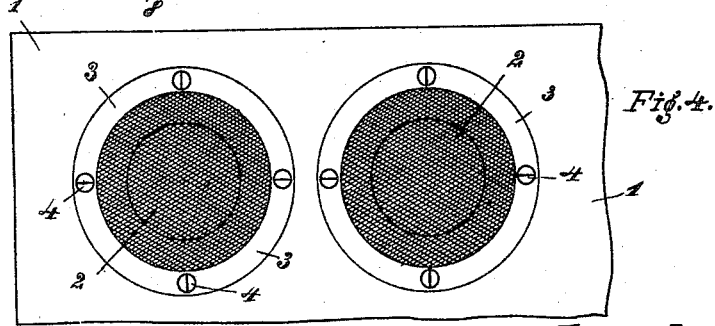

Referring in the first place to Figs. 1 and 4, the lower board consists of a plate 1 of wood, metal or other suitable material with cavities $a$ in its upper surface. Each of these cavities is in part cylindrical and in part conical but this particular shape is not essential to the invention. The cavity may be spherical or of other shape, but it is essential that when the elastic dish 2 of wire network has been fixed into the cavity, there is a space between the under surface of the dish and the bottom of the cavity. This space serves as a container for meal. The dish is fixed by means of a clamping ring 3, which is flush with the upper surface of the board and is fastened down by screws 4. Other means of fastening may be used, for example a ring with a bayonet joint, or a ring which is screwed into a screw-threaded recess in the board. The upper board consists of a plate 5 of wood, metal or other suitable material, of a thickness proportionate to the size of the lumps of dough to be kneaded. The board 5 has cylindrical perforations $b$ which are opposite the cavities $a$ and of the same diameter as the dishes 2. Over each perforation $b$ there is an inverted dish 6 of wire netting fastened down by a ring 7 and screws 8. This dish 6 is substantially a segment of a sphere, but this particular shape is not essential to the invention. Each dish 6 has two inwardly directed folds or ridges 9 adapted to engage the dough pressed into the dish. In the construction shown there are two ridges 9, diametrically opposite each other, but there may be more than two or only one, and each ridge may extend over a complete arc of the dish. In the latter case, the resultant work is quite smooth on top, whereas if the ridges stop short of the center the central part of the work is corrugated in compact folds, which is preferred by some bakers as giving better results in the oven.

For kneading the dough between the dishes 2 and 6, the boards are moved toward each other, and one of them is then given a rotatory movement relative to the other. This movement may be imparted by hand, or in a kneading machine of any of the types which have means for actuating kneading boards in the manner described. During the kneading operation meal is supplied to the work through the perforated dish 6, and generally speaking, enough of this meal works its way through to the space under the dish 2, to obviate the necessity of replenishing the supply by other means. The small rounded surfaces forming the walls of the apertures in the dishes 2 and 6 prevent the clogging of these apertures by dough, so that a continuous supply of meal can take place. The elasticity of the dishes improves the kneading action; and the apparatus produces more uniformly and thoroughly kneaded work than the kneading boards heretofore used in a similar manner.

In the modification shown in Fig. 2 the dishes $2^1$ are fixed by means of rings $3^1$ and screws $4^1$ in holes $a^1$ formed above a cavity 10 in the board $1^1$. This cavity contains a drawer $10^1$, by means of which the supply of meal for both the dishes $2^1$ can be conveniently replenished.

What I claim as my invention and desire to secure by Letters Patent of the United States is:—

1. Kneading apparatus comprising a lower kneading board having a cavity in its upper surface, a dish of perforated elastic material fixed in said cavity clear of the bottom of the latter, an upper kneading board having a hole therein, and a diaphragm of perforated elastic material fastened to the upper board and subtending said hole.

2. Kneading apparatus comprising a lower kneading board having a cavity in its upper surface, a dish of perforated elastic material fixed in said cavity clear of the bottom of the latter, an upper kneading board having a hole therein, and a diaphragm of perforated elastic material fastened to the upper board and subtending said hole, said diaphragm having a downwardly directed ridge.

3. Kneading apparatus comprising a lower kneading board having a cavity in its upper surface, a dish of wire-netting fixed in said cavity clear of the bottom of the latter, an upper kneading board having a hole therein and a diaphragm of wire-netting fastened to the upper board and subtending said hole.

4. Kneading apparatus comprising a lower kneading board having a cavity in its upper surface a dish of perforated elastic material fixed in said cavity clear of the bottom of the latter, a meal drawer slidable in said cavity below said perforated dish, an upper kneading board having a hole therein, and a diaphragm of perforated elastic material fastened to the upper board and subtending said hole.

In witness whereof I have signed this specification in the presence of two witnesses.

JOHANNES KRETZSCHMAR.

Witnesses:
RUDOLPH FRICKE,
ALBERT R. MORAWITZ.